United States Patent [19]

Kurome et al.

[11] 4,156,821

[45] May 29, 1979

[54] CAPACITOR RUN MOTOR

[75] Inventors: Shoshaku Kurome, Kasai; Yoshifumi Miyazaki, Hyogo, both of Japan

[73] Assignee: Sanyo Electric Co., Ltd., Japan

[21] Appl. No.: 785,829

[22] Filed: Apr. 8, 1977

[30] Foreign Application Priority Data

Apr. 12, 1976 [JP] Japan ................................. 51/42169

[51] Int. Cl.² ........................................... H02K 17/08
[52] U.S. Cl. ..................................... 310/166; 310/172; 310/90; 310/254
[58] Field of Search ............... 310/166, 172, 184, 198, 310/254, 216, 217, 90; 318/220 B

[56] References Cited

U.S. PATENT DOCUMENTS

| | | | |
|---|---|---|---|
| 3,054,010 | 9/1962 | Breitling | 310/166 |
| 3,295,034 | 12/1966 | Herzog | 318/224 R |
| 3,413,501 | 11/1968 | Dotto | 310/172 |
| 3,433,988 | 3/1969 | Arnold | 310/166 |

Primary Examiner—Donovan F. Duggan
Attorney, Agent, or Firm—Staas & Halsey

[57] ABSTRACT

A single phase induction motor of a capacitor run type comprising: a stator including a stator core having a circle aperture and a plurality of slots formed extending in the axial direction of the aperture whereby a plurality of teeth are formed therebetween, two main winding coils wound around two teeth to form two main excited poles of the same polarity at the diametrical positions of the stator core, the two main excited poles of one polarity causing two main image poles of the opposite polarity at the positions between the excited poles, two auxiliary winding coils wound around two teeth, shifted by one tooth from those of the main winding coils, to form two auxiliary excited poles of the same polarity at the diametrical directions of the stator core, the two auxiliary excited poles of one polarity causing at least two auxiliary image poles of the opposite polarity at the positions between the auxiliary excited poles, whereby two pairs of main and auxiliary excited and image poles are formed sequentially in the circumferential direction of the aperture, whereby a rotating magnetic field is generated through interaction of the main and auxiliary magnetic fields by the pairs of poles; a capacitor connected in series with the auxiliary winding coils for shifting the phase of the current flowing therethrough; a rotor mounted to rotate within said aperture of the stator core; a bracket having bearings for rotatably supporting the rotor within the aperture of said stator core, the bracket being mounted to the positions at the end surfaces of the stator core where the teeth are not wound of winding coils and the image magnetic coils are formed; and bolts and nuts for fixing the bracket to said stator core at said positions where teeth are not wound of coils.

9 Claims, 10 Drawing Figures

CAPACITOR RUN MOTOR

BACKGROUND OF THE INVENTION

1. Field of the Invention

The present invention relates to a capacitor run motor. More specifically, the present invention relates to an improvement in a bracket arrangement for mounting bearings for a rotor in a capacitor run type single phase induction motor.

2. Description of the Prior Art;

Single phase induction motors have been widely used nowadays as a prime mover for driving a variety of relatively small sized machines. Various schemes for running single phase induction motors have also been proposed and put in practical use. A typical scheme for running a small sized single phase induction motor comprises generation of a rotating magnetic field by means of a main winding and an auxiliary winding wound in slots formed on the inner surface of an aperture of the stator core and a capacitor connected in series with the auxiliary winding for the purpose of advancing the phase of the current in the auxiliary winding with respect to that of the main winding. Such a motor is often referred to as a capacitor run motor. A more detailed structure of such a prior art capacitor run motor is considered in the following.

Figure 1:
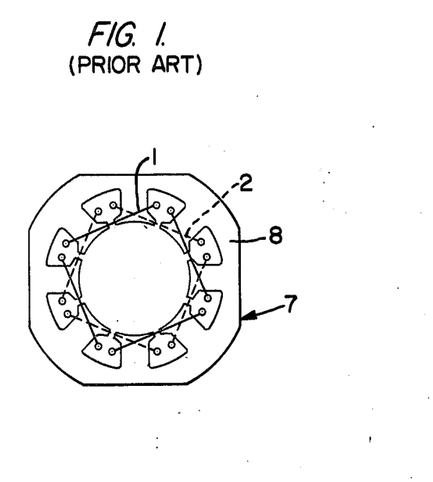
FIG. 1 is an end schematic view of the stator as wound of the windings of a typical prior art capacitor run motor.
Figure 2:
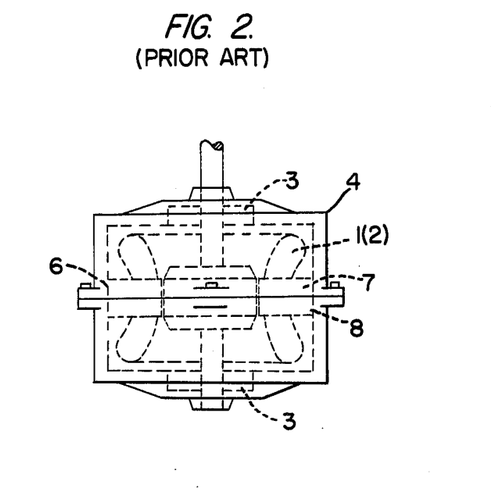
FIG. 2 is a side view of such a typical prior art capacitor run motor.

FIG. 1 is an end schematic view of the stator as wound of the windings of a typical prior art capacitor run motor. FIG. 2 is a side view of such a typical prior art capacitor run motor. Referring to FIG. 1, a stator core 7 comprises a stack of a plurality of core material plates of the shape as seen in FIG. 1. The stator core 7 as shown comprises a circle aperture and eight slots equally spaced apart from each other and extending in parallel with the axial direction of the stator core 7, whereby eight teeth are formed between the slots. A main winding 1 and an auxiliary winding 2 are wound in the slots around the periphery of two adjacent teeth of the stator core in the so called full pitch winding manner such that the main and auxiliary windings are dislocated by one tooth. As a result, in the motor shown, four main winding coils and four auxiliary winding coils are formed which extend through the slots in the axial direction of the stator core and turn at the opposite ends of the stator core in terms of the axial direction, while the coil ends at the opposite stator core ends each form a continuous mass 5 of coils in a ring shape protruding from the end surfaces of the core in the axial direction with the diameter slightly larger than that of the circle aperture of the stator core. A bracket 4 of half shell structure is mounted to the stator core 7 by fitting, through compression, the yoke 8 of the stator core 7 to the opening portion 6 of each half shell such that the stator core 7 is housed in the bracket 4 and bearings 3 provided in the bracket 4 support the shaft of a rotor. In view of the fact that the prior art motor of the type now in discussion comprises the coil ends at the opposite ends of the stator core 7 which are each of a continuous mass of coils in a ring shape, it is necessary that the inner geometry of the bracket is larger than the outer geometry of the coil ends of the stator. More specifically, the inner diameter of the bracket must be larger than the outer diameter of the above described coil end ring mass in the radial direction and the inner end walls of the bracket must be spaced from the end surface of the stator core sufficiently enough to clear the coil ends. Thus, the bracket of a motor of this type becomes somewhat bulky. Nevertheless, a motor of this type is often used as a prime mover in various small sized machines. Therefore, the bulk of the bracket of a motor of this type makes the machine bulky accordingly. Thus, it is most desirable that a capacitor run motor improved of the bulkiness of the bracket for the stator is provided without degrading the performance thereof. Another problem encountered in the illustrated prior art motor is that since the opening 6 of the half shell of the bracket is fitted to the periphery of the yoke 8 of the stator core 7 high precision is required for the geometry of the opening 6 and the yoke 8, which makes complicated the cutting of the material for the bracket and the stator core and makes the cost expensive.

As to be discussed infra, the present invention employs a stator arrangement wherein image poles are used. Such a single phase induction motor as employs image poles has also been proposed. An example of a single phase induction motor employing a stator arrangement wherein image poles are employed is disclosed in U.S. Pat. No. 3,295,034, entitled "Two-Speed Single-Phase Electric Motor", issued Dec. 27, 1966 to George E. Herzog and assigned to Westinghouse Electric Corporation. More specifically, an image pole type induction motor is structured such that the stator comprises a half number of main and auxiliary poles of the same polarity to be excited by windings and the main and auxiliary windings are provided on the excited poles so as to form main and auxiliary image poles by way of opposite polarity of the half number of main and auxiliary excited poles, whereby the rotating magnetic flux is generated between main and auxiliary pairs of the excited and image poles. Presumably, such an image pole type induction motor must be advantageous in that a less number of main and auxiliary winding coils are mounted and hence the structure becomes simple and the assembly is fascilitated. Nevertheless, induction motors of such an image pole type have been very seldom put into market. The reason is presumably that although the number of winding coils is decreased by half, the number of turns of each of the winding coils must be increased accordingly and hence labor is required for that purpose, with the result that substantial labor is not saved, while another problem is encountered that some loss of magnetic flux is caused and efficiency of the power is accordingly decreased say by several percent. In the past, only for these reasons, designers of single phase induction motors, particularly capacitor run motors of a relatively small size have never thought of employment of an image pole stator arrangement.

A single phase induction motor comprising a main winding and an asymmetrical auxiliary winding has also been proposed. An example of such an induction motor having an asymmetrical auxiliary winding is disclosed in U.S. Pat. No. 3,433,988, entitled "Slab Side Motor With An Asymmetrical Starting Winding" and issued Mar. 18, 1969 to Harold B. Arnold and assigned to Emerson Electric Company. As known to those skilled in the art, a single phase induction motor with an asymmetrical auxiliary winding brings about an increased starting torque and an increased slip in terms of the maximum rotation speed as compared with a similar motor with a symmetrical auxiliary winding. Because of these characteristics, a single phase induction motor with an asymmetrical auxiliary winding can be advantageously used depending on applications. As become apparent from the following description, the present invention can be applied to a capacitor run motor with an asymmetrical auxiliary winding with particular advantage.

SUMMARY OF THE INVENTION

Briefly described, the present invention comprises a single phase induction motor of a capacitor run type comprising: a stator including a stator core having a circle aperture and a plurality of slots spaced apart from each other extending in the axial direction of the aperture whereby a plurality of teeth are formed between the adjacent two slots, at least two main winding coils wound around a tooth spaced apart from each other to form at least two main magnetic poles as excited by the main winding coils at the positions spaced from each other, the at least two main excited poles of one polarity causing at least two main image magnetic poles of the opposite polarity at the positions between the excited poles, whereby at least two pairs of main excited and image poles are formed sequentially in the circumferential direction of the aperture, at least two auxiliary winding coils each wound around a tooth spaced apart from each other to form at least two auxiliary magnetic poles excited by the auxiliary winding coils at the positions spaced apart from each other, the at least two auxiliary excited poles of one polarity causing at least two auxiliary image magnetic poles of the opposite polarity at the positions between the excited poles, whereby at least two pairs of auxiliary excited and image poles are formed sequentially in the circumferential direction of the aperture, whereby a rotating magnetic field is generated through interaction of the auxiliary magnetic field by the pairs of auxiliary excited and image poles with the main magnetic field by the pairs of main excited and image poles; a capacitor connected in series with the auxiliary winding coils for shifting the phase of the current of the auxiliary winding coils; a rotor mounted to rotate within the aperture of the state core as a function of the rotating magnetic field; a bracket having bearings for rotatably supporting the rotor within the aperture of the stator core, the bracket being mounted to the positions at the end surfaces of the stator core where said image magnetic poles are formed; and means for fixing said bracket to the stator core.

As discussed supra, typical prior art motors comprise the coil ends at the opposite ends of the stator core which are each of a continuous mass of coils in a ring shape. Therefore, it is necessary that the inner geometry of the bracket is larger than the geometry of the coil ends of the stator. By contrast, according to the present invention, the coil end is separated at the positions where the image magnetic poles are formed, inasmuch as no winding is wound at the positions. According to the present invention, skilful use is made of the positions where the coil end does not exist and the image pole is formed for the purpose of fixing the bracket to the stator core. Mounting the bracket to the stator core at the positions where the coil ends are separated makes compact the structure of the bracket. Thus, the bulk of bracket and thus the motor per se can be reduced without adverse affect on the performance of the motor.

As discussed supra, the present invention employs a stator arrangement where image poles are used. The merits and demerits of such a single phase induction motor as employs image poles have been fully discussed previously. In summary, such an image pole type induction motor is advantageous in that a less number of winding coils are mounted and hence the structure becomes simple and the assembly is facilitated at the sacrifice of increase of the number of turn of the each of the winding coils and some loss of magnetic flux which decreases the efficiency of the power say by several percent. According to the present invention, however, a remarkable advantage is instead brought about that a compact structure of bracket for a capacitor run motor is provided through skilful use of the positions at the stator core ends where the coil ends are separated. Thus, a capacitor run motor can be made small sized by making compact the bracket.

Therefore, a principal object of the present invention is to provide an improved single phase induction motor of a capacitor run type which is made small sized.

Another object of the present invention is to provide an improved single phase induction motor of a capacitor run type wherein the bracket structure is made compact and thus the motor per se is made small sized.

A further object of the present invention is to provide a single phase induction motor of a capacitor run type wherein mounting of the bracket to the stator core is improved whereby the bracket structure is made compact and thus the motor per se is made small sized.

Still a further object of the present invention is to provide an improved single phase induction motor of a capacitor run type wherein a stator arragement is adapted to be of an image pole type and the space where the coil ends are separated are skillfully used for mounting the bracket to the stator core whereby the bracket structure is made compact and thus the motor per se is made small sized.

It is another object of the present invention to provide an improved single phase induction motor of a capacitor run type which can be manufactured with less cost.

It is a further object of the present invention to provide an improved single phase induction motor of a capacitor run type wherein the bulk of the motor per se is made small sized with a decreased cost and without substantial degradation of the performance of the motor. According to one embodiment of the present invention, the cost was decreased by 25% and the bulk of the motor was reduced by 35%.

An aspect of the present invention is to make skilful use of a stator arrangement where image poles are used. More specifically, the portions at the stator core ends where the coil ends are separated are skilfully used to mount the bracket to the stator core.

Another aspect of the present invention is that such portions at the stator core ends where the coil ends are separated can be broadend as desired, thereby to make the stator arrangement asymmetical, whereby mounting of the bracket to the stator core is facilitated while the stator arrangement is made asymmetrical. The merits of the capacitor run motors with an asymmetrical stator arrangement have been discussed supra.

These objects and other ojects, features, aspects and advatages of the present invention will become more apparent from the following detailed description of the present invention when taken in conjunction with the accompanying drawings.

DESCRIPTION OF THE PREFERRED EMBODIMENTS

Figure 3:
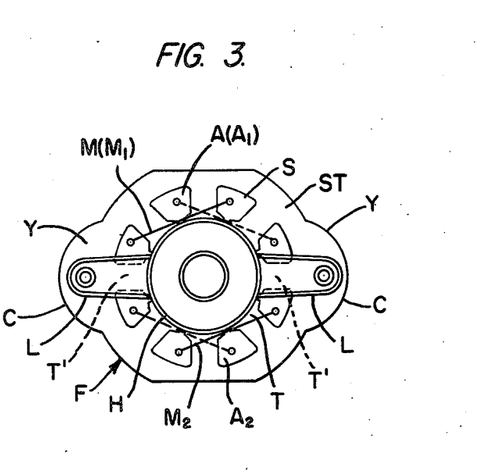
FIG. 3 is an elevational view of one embodiment of the inventive capacitor run motor.
Figure 4:
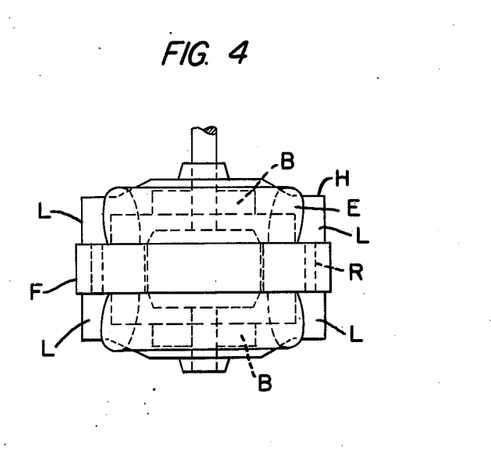
FIG. 4 is a side view of the FIG. 3 motor.

FIG. 3 shows an elevational view of one embodiment of the inventive capacitor run motor and FIG. 4 shows a side view of the FIG. 3 motor. Referring to FIG. 3, a stator ST comprises a stator core F, a main winding M and an auxiliary winding A. More specifically, the stator core F is made of a stack of pressed silicon steel plates fixed to each other and is formed of a circle sectional aperture extending in an axial direction of the core and eight slots S formed on the inner surface of the aperture spaced equally apart from each other in the circumferential direction of the circle section of the aperture and extending in parallel in the axial direction of the aperture. As a result eight teeth T are formed between the adjacent two slots S.

In the embodiment shown, the main winding M comprises two main winding coils M1 and M2, each wound arround two teeth such that the coils M1 and M2 are spaced equally apart from each other to form main magnetic poles of the same polarity. As a result two main magnetic poles are generated by virtue of excitation of these two main winding coils M1 and M2 at the diametrical positions. Since these two main winding coils M1 and M2 are wound to form the main magnetic poles of the same polarity, these two main excited magnetic poles of one polarity causes two main image magnetic poles of the opposite polarity at the positions between these main excited magnetic poles as a function of the image effect. As a result two pairs of main excited and image magnetic poles are established sequentially in the circumferential direction of the circle section of the aperture.

Similarly, the auxiliary winding A comprises two auxiliary winding coils A1 and A2, each wound around two teeth such that the coils A1 and A2 are spaced apart from each other to form auxiliary magnetic poles of the same polarity. It should be pointed out that these two auxiliary winding coils A1 and A2 are wound around two teeth displaced by one tooth from those two teeth where the main winding coils M1 and M2 are wound. Thus, two auxiliary magnetic poles are generated by virtue of excitation by these auxiliary winding coils A1 and A2 at the positions displaced equally from each other i.e. displaced by two teeth from each other but displaced by one tooth from the positions of those main winding coils in the circumferential direction of the circle section of the aperture. Similarly, these two auxiliary excited magnetic poles of one polarity cause two auxiliary image magnetic poles of the opposite polarity at the positions between these auxiliary excited magnetic poles as a function of the image effect. As a result, two pairs of auxiliary excited and image magnetic poles are arranged sequentially in the circumferential direction of the circle section of the aperture.

It should be noted that since eight slots are formed and accordingly eight teeth are formed and two pairs of teeth in the diametrical direction are used for formation of the main winding M while another two pairs of teeth in the diametrical direction are used for formation of the auxiliary winding A, while one pair of teeth is used commonly, there is one pair of teeth T' left unwound of any winding coils. It should be further noted that the main and auxiliary image poles are formed in the vicinity of these teeth T' which are not wound of any winding coils. As discussed supra, a typical prior art motor usually comprises coil ends of a continuous mass of a ring shape protruding at the opposite stator core end surfaces. By contrast, with the inventive motor, the core ends E are separated at the positions where the teeth T' are left unwound of any winding coils and where the image magnetic poles are established. The present invention contemplates skillful use of these separated or unwound portions T' for the purpose of mounting a bracket of the motor to the stator core as to be more fully described subsequently.

As well known to those skilled in the art, the auxiliary winding coils are connected in series with a capacitor for the purpose of shifting the phase of the current flowing through the auxiliary winding coils with respect to the phase of the current flowing through the main winding coils. As a result, the phase of the current flowing through the auxiliary winding coils and thus the auxiliary magnetic field provided by the pairs of auxiliary excited and image magnetic poles are advanced with respect to the phase of the current flowing through the main winding coils and thus the main magnetic field provided by the pairs of main excited and image magnetic poles. The auxiliary magnetic field provided by the pairs of auxiliary excited and image magnetic poles interacts with the main magnetic field provided by the pairs of main excited and image magnetic poles to provide a resultant rotating magnetic field.

With simultaneous reference to FIGS. 3 and 4, a pair of U letter shaped bracket members H each including a bridge portion and two leg portions L are mounted to the yoke of the stator core F at the opposite end surfaces of the stator core F at the position of the above described pair of teeth T' which are not wound of any winding coils. More specifically, bolt apertures are formed extending through the leg portions L of the bracket members H and similarly bolt apertures R are formed in the stator core F at the positions of the teeth T' with no winding in alignment with the bolt apertures of the leg portions L of the bracket members H. The bolt apertures of these leg portions L of the bracket members H and the stator core F are aligned and then bolts are inserted through the bolt apertures and the bracket members H and the stator core F are fastened by threading nuts to the bolt. The bracket members H are provided with bearings B so as to rotatably support the shaft of the rotor within the circle sectional aperture of the stator core F in the well known manner. In mounting the bracket members H to the stator core F by the use of the bolts and nuts, the bolt apertures may be formed in the stator core F, as described previously. In such an instance, protrusions C are preferably formed to compensate for the void of the magnetic material so as not to cause a magnetic saturation in the vicinity of the bolt apertures due to the decrease of the magnetic material. Alternatively, bolt grooves may be formed on the outer surface of the stator core F in the vicinity of the said teeth T' with no winding, instead of the bolt apertures, in order to receive the bolts for fastening the bracket members H to the stator core F. In such an instance, it is not necessary to form the above described protrusions C.

As best seen in FIG. 4, the bracket members H may be formed such that the bridge portions may get near the end surfaces of the stator core F even beyond the extremities of the coil ends E in the axial direction, inasmuch as there is no winding coils wound around the teeth T' where the bracket members H are mounted to the stator core F according to the present invention. In other words, the bracket structure of the inventive motor can be made compact in the axial direction of the motor. In addition, the bracket members H may be formed such that the leg portions L of the bracket members H may approach toward the center of the stator core F, inasmuch as there is no winding coils wound around the teeth T' where the bracket members H are mounted to the stator core F, according to the present invention. Thus, the bracket members H may be formed such that the leg portions L of the bracket members H may be as near as possible the center of the stator core F, insofar as any other adverse affect is not caused. Thus, according to the present invention, the bracket structure can also be made compact in the radial direction. In view of the fact that the bridge portions can be shifted toward the end surfaces of the stator core and the leg portions can be shifted toward the center of the stator core, a compact bracket structure can be attained in accordance with the present invention. In the past, the thought of the slight decrease of power efficiency made motor designers feel disinclined to adopt a capacitor run motor of an image pole type. Nevertheless, the present invention makes skillful use of the separated portions of the coil ends E where no winding is wound in such an induction motor of an image pole type, thereby to make possible very compact structure of the bracket in such a motor. Thus, in accordance with the present invention, a very compact capacitor run motor can be provided without any substantial degradation of the performance and efficiency of the motor.

Figure 5:
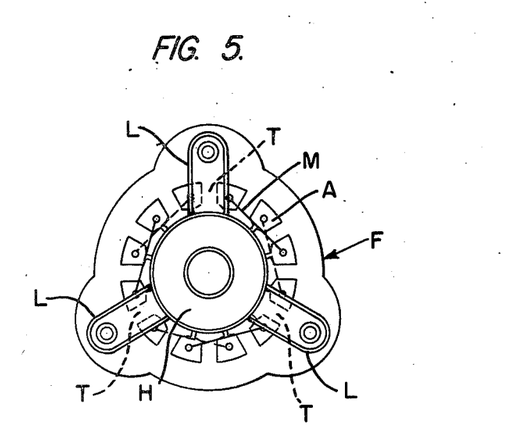
FIG. 5 is an elevational view of another embodiment of the inventive motor.

FIG. 5 is an elevational view of another embodiment of the inventive motor. Referring to FIG. 5, the embodiment shown has been structured of six-pole arrangement of main and auxiliary windings rather than four-pole arrangement of the embodiment shown in FIGS. 3 and 4. Accordingly, twelve slots are formed on the inner surface of the circle sectional aperture. The arrangement of the main and auxiliary winding coils is self-explanatory in the light of the detailed description of the embodiment shown in FIGS. 3 and 4. According to the FIG. 5 embodiment, three teeth are left unwound of any winding coils in place of two unwound teeth in the embodiment shown in FIGS. 3 and 4, because of the difference of the number of the slots and teeth and the number of winding coils and accordingly the number of pairs of excited and image poles. Therefore, in the FIG. 5 embodiment, the bracket members H of three leg portions are employed such that these leg portions may be fixed to three areas of teeth left unwound of any winding coils. Since the structure of other portions is substantially the same as that of the embodiment shown in FIGS. 3 and 4, like portions have been denoted by the same reference characters. Therefore, it is not believed necessary to describe in more detail the FIG. 5 embodiment.

Figure 6:
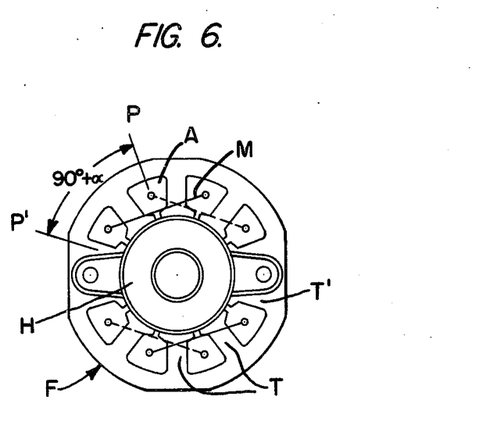
FIG. 6 is an end view of a further embodiment of the inventive motor wherein the present invention has been embodied in a single phase induction motor of a capacitor run type with an asymmetrical winding arrangement.

FIG. 6 is an end view of a further embodiment of the inventive motor wherein the present invention has been embodied in a single phase induction motor of a capacitor run type with an asymmetrical winding arrangement. Such a single phase induction motor with an asymmetrical winding arrangement was briefly discussed previously by citation of U.S. Pat. No. 3,433,988. Now referring to FIG. 6, the embodiment shown is similar to the FIG. 3 embodiment that comprises a pair of unwound teeth which are structured to be wider in width as compaired with that of other teeth, as readily seen in the figure. This means that the slots are not equally spaced from each other. The broadening of these unwound teeth bring about two advantages in conjunction with the embodiment shown. One of the advantages is that the broadened unwound teeth facilitate mounting of the bracket members to the stator core because of the broader area for the mounting. The other advantage is that a capacitor run motor with an asymmetrical winding arrangement can be provided with ease, while the mounting of the bracket members to the stator core is facilitated as discussed supra. As well known to those skilled in the art, an asymmetrical winding arrangement of the stator in an induction motor makes the electric angle between the main and auxiliary magnetic poles larger than 90 degrees, which in turn improve the starting characteristic of the motor and make it possible to effect a balance operation at an increased slip or at an increased load. Consider a particular application of this type of motor to electric fans. As well known to those skilled in the art, an induction motor of an increased torque and decreased balance operation speed is desired as a prime mover for electric fans from the standpoint of noise. Since domestic electric fans are energized by the commercial power supply, an induction motor of six-pole type is ideally used for the above described purpose. However, this makes complicated the structure of the motor. Nevertheless, a four-pole structure motor gives rise to an increased rotation speed as compared with a six-pole structure motor. As described above, an induction motor with an asymmetrical winding arrangement achieves a higher torque and a decreased balance rotation speed, which are most desirable requirements as a motor for domestic electric fans. Thus, the embodiment shown is most preferred as a prime mover for domestic electric fans.

Figures 7, 8:
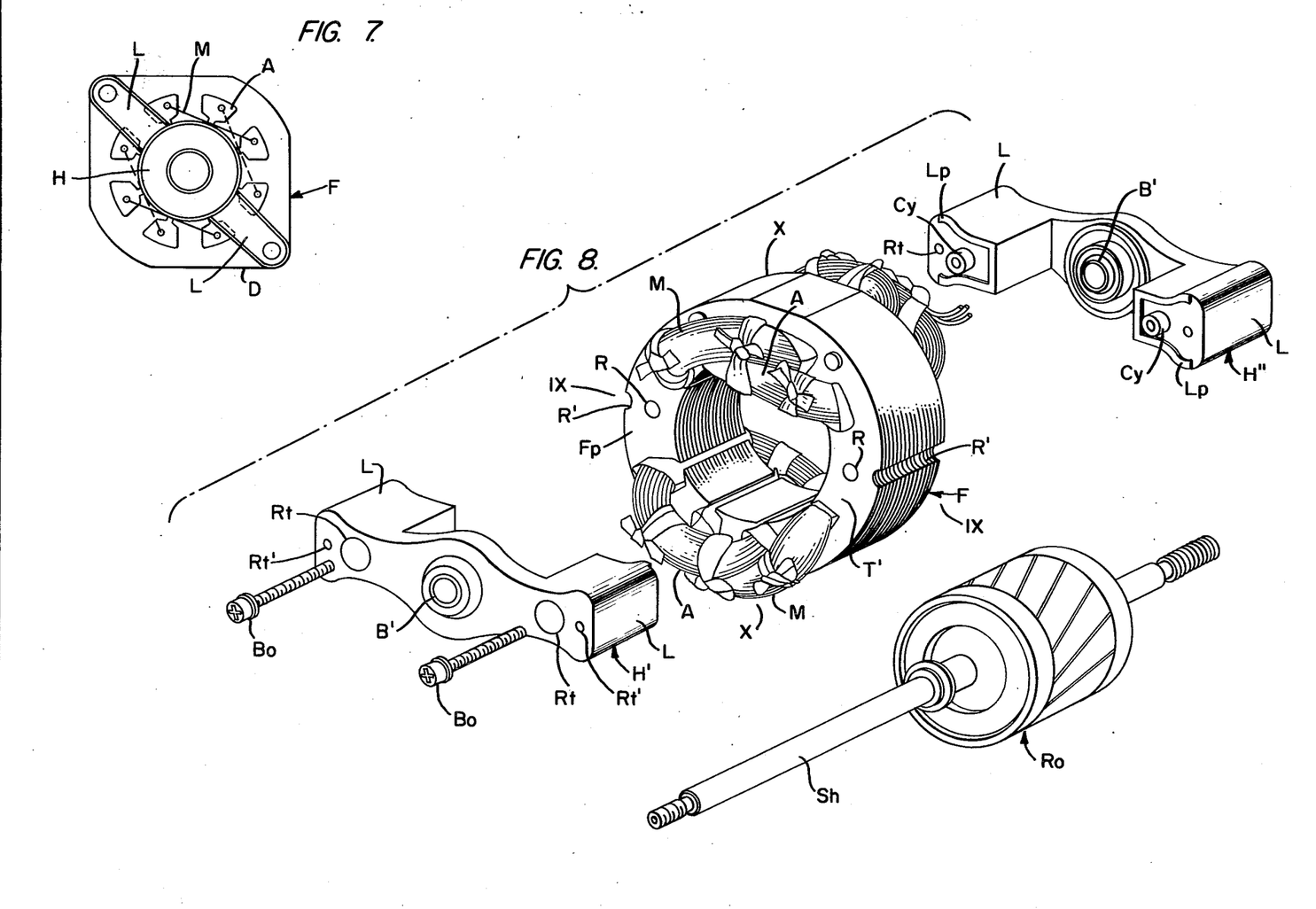
FIG. 7 is an end view of still a further embodiment of the inventive motor.
FIG. 8 is a perspective view of a disassembled motor of a preferred embodiment of the present invention designed for the purpose of marketing.

FIG. 7 is an end view of still a further embodiment of the inventive motor. Referring to FIG. 7, two diametrical ends are extended to form corner portions D in place of the protrusions C in the FIG. 3 embodiment. It is recalled that the stator core is normally made of a stack of pressed silicon steel plates which are fixed to each other. Therefore, such corners D may be readily formed by simply selecting the geometry of each silicon steel plate to be pressed. Such corner portions D are adapted to be aligned with the unwound teeth where image poles are extablished. Hence, these corner portions may also been advantageously used for mounting the bracket members to the stator core.

Figure 9:
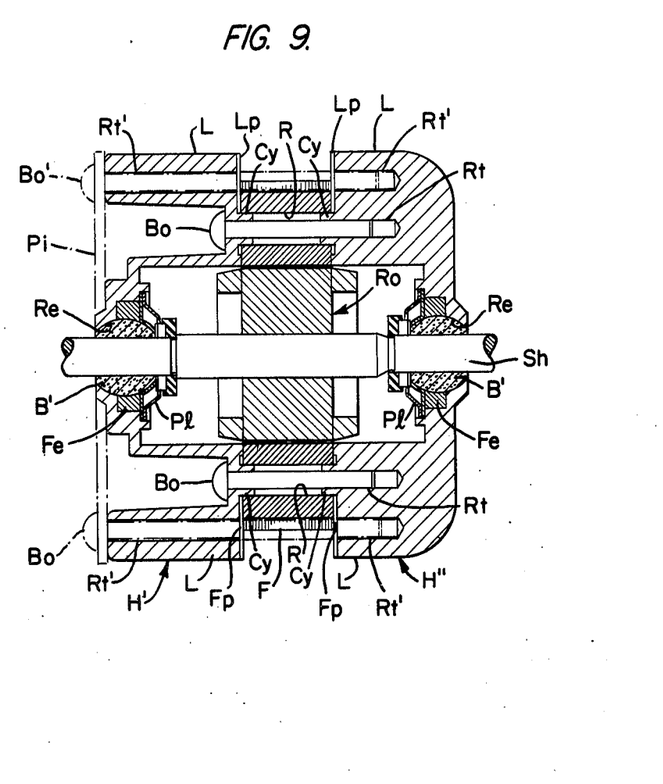
FIG. 9 is a sectional view of the FIG. 8 embodiment, as assembled, taken along the line IX—IX in FIG. 8.
Figure 10:
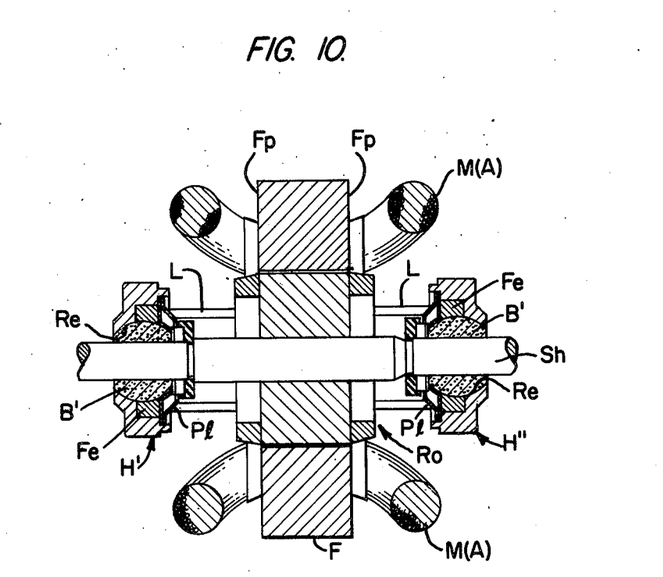
FIG. 10 is a sectional view of the FIG. 8 embodiment, as assembled, taken along the line X—X in FIG. 8.

FIG. 8 shows a perspective view of a disassembled motor of a preferred embodiment of the present invention designed for the purpose of marketing. FIG. 9 is a sectional view of the FIG. 8 embodiment taken along the line IX—IX in FIG. 8. FIG. 10 is a sectional view of the FIG. 8 embodiment taken along the line X—X in FIG. 8. It is pointed out that the embodiment shown in FIGS. 8 through 10 has been designed for adaptation to marketing based upon the embodiments described in conjunction with FIGS. 4 and 6. Therefore like portions have been denoted by like reference characters throughout the figures. In the following, therefore, the embodiment shown in FIGS. 8 through 10 will be described mainly centering on the modified portions.

A pair of U letter shaped bracket members H' and H" are each formed of central recesses Re for receiving the bearings B', which are inserted to the recesses Re together with grease felts Fe, whereupon the bearings B' are supported by means of bearing plates Pl. The bracket members H' and H" are formed of cylindrical portions Cy at the respective end surfaces of the leg portions L for positioning the bracket members H' and H" by being inserted into the bolt apertures R of the stator core F, so that the bracket members H' and H" are fixed to the stator core F while the bracket members are properly positioned with respect to the stator core F by simply threading the nuts to the bolts Bo to fasten both bracket members H' and H" with the stator core F therebetween. The bracket members H' and H" are further provided with peripheral protuberances Lp extending along the edge of the end surfaces of the leg portions L of the bracket members H' and H" so that the protuberances Lp may contact the end surfaces Fp of the stator core F. The bracket members H' and H" are further formed of bolt apertures Rt' at the positions outside of the positions for the bolt apertures Rt of the bolts Bo extending through the leg portions L in the axial direction. Accordingly the stator core is also formed of the bolt grooves R' in alignment with the above described bolt apertures Rt' of the bracket members H' and H". The bolt apertures Rt' are used for a threadably receiving bolts Bo' for the purpose of fixing a fixing plate Pl'. The plate Pl' may be used to mount various associated components. The rotor Ro is mounted rotatably such that the shaft Sh of the rotor is rotatably supported by the bearings B' of the bracket members H' and H". According to the embodiment shown, the bracket members are not fitted to the periphery of the yoke of the stator core for the purpose of mounting the bracket members to the stator core but rather the bracket members are fixed to the end surfaces of the stator core. As a result processing of the periphery of the stator core for the purpose of precise finish for fitting can be dispensed with as compared with the prior art motor, which makes the assembly simple and the manufacturing cost smaller.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A single phase induction motor of a capacitor run type comprising:
   a stator including
   a stator core formed of a circle sectional aperture extending in an axial direction and a plurality of slots formed on the inner surface of said aperture spaced apart from each other in the circumferential direction of the circle section of said aperture and extending in parallel in the axial direction of said aperture, whereby a plurality of teeth are formed between the adjacent two slots,
   at least two main winding coils, each wound around at least one tooth spaced apart from each other to form a main magnetic pole of the same polarity, whereby at least two main magnetic poles are generated by virtue of excitation by said main winding coils at the displaced positions in the circumferential direction of the circle section of said aperture, said at least two main excited magnetic poles of one polarity causing at least two main image magnetic poles of the opposte polarity at the positions between said main excited magnetic poles as a function of the image effect, whereby at least two pairs of main excited and image magnetic poles are arranged sequentially in the circumferential direction of the circle section of said aperture, and
   at least two auxiliary winding coils, each wound around at least one tooth spaced apart from each other and dislocated from said at least two main winding coils to form an auxiliary magnetic pole of the same polarity, whereby at least two auxiliary magnetic poles are generated by virtue of excitation by said auxiliary winding coils at the displaced positions in the circumferential direction of the circle section of said aperture, said at least two auxiliary excited magnetic poles of one polarity causing at least two auxiliary image magnetic poles of the opposite polarity at the positions between said auxiliary excited magnetic poles as a function of the image effect, whereby at least two pairs of auxiliary excited and image magnetic poles are arranged sequentially in the circumferential direction of the circle section of said aperture,
   the auxiliary magnetic field provided by said pairs of auxiliary excited and image magnetic poles interacting with the main magnetic field provided by said pairs of main excited and image magnetic poles to provide a resultant rotating magnetic field,
   a capacitor connected in series with said auxiliary winding coils for shifting the phase of the current flowing through said auxiliary winding coils with respect to the phase of the current flowing through said main winding coils,
   a rotor mounted to rotate within said circle sectional aperture under the influence of said rotating magnetic field,
   bracket means having a bearing means for rotatably supporting said rotor within said circle sectional aperture, said bracket means being mounted to the positions at the end surfaces of said stator core where the coil end does not exist and said image magnetic poles are formed,
   means for fixing said bracket means to said stator core,
   said bracket means comprising at least one member having a bridge portion and at least two leg portions, said leg portions being fixed to the stator core at the positions of said image magnetic poles,
   and the inner surface of said bridge portion of the bracket means being closer to the stator core than the respective outer ends of the stator winding coils.

2. A single phase induction motor of a capacitor run type in accordance with claim 1, wherein said slots are equally spaced.

3. A single phase induction motor of a capacitor run type in accordance with claim 1, wherein the width of said teeth is selected to be larger at the positions of said image magnetic poles where said bracket means are fixed to the stator core.

4. A single phase induction motor of a capacitor run type in accordance with claim 1, wherein said bearing means is mounted in said bridge portion of said bracket means.

5. A single phase induction motor of a capacitor run type in accordance with claim 4, wherein said leg portions of said bracket means are formed of bolt apertures extending in said axial direction, and said fixing means comprises bolts being inserted through said bolt apertures formed in said leg portions of said bracket means.

6. A single phase induction motor of a capacitor run type in accordance with claim 5, wherein said stator core is formed of bolt apertures in alignment with said bolt apertures of said leg portions of said bracket means, and said bolts are inserted through said bolt apertures of said bracket means and said bolt apertures of said stator core.

7. A single phase induction motor of a capacitor run type in accordance with claim 5, wherein said stator core is formed of bolt grooves at the periphery thereof in alignment with said bolt apertures of the leg portions of said bracket means, and said bolts are inserted through said bolt apertures of said leg portions of said bracket means and through said bolt grooves of said stator core.

8. A single phase induction motor of a capacitor run type in accordance with claim 6, wherein said bracket means are formed of cylindrical portions at the respective end surfaces of the leg portions for positioning said bracket means by being inserted into the bolt apertures of said stator core.

9. A single phase induction motor of a capacitor run type in accordance with claim 1, wherein said stator core comprises extended end portions in diametrical directions of said aperture, where said image magnetic poles are formed, and said extended ends are used for fixing said bracket means to said stator core.

* * * * *

UNITED STATES PATENT AND TRADEMARK OFFICE
CERTIFICATE OF CORRECTION

PATENT NO. : 4,156,821
DATED : May 29, 1979
INVENTOR(S) : SHOSHAKU KUROME ET AL.

It is certified that error appears in the above-identified patent and that said Letters Patent are hereby corrected as shown below:

Col. 1, line 10, "2. Description of the Prior Art;" should be on a separate line. Also, the ";" should be deleted.

Col. 4, line 2, "turn" should be --turns--.

Col. 4, line 28, "skillfully" should be deleted.

Col. 4, line 57, "ojects" should be --objects--.

Col. 4, line 58, "advatages" should be --advantages--.

Col. 5, line 40, "arround" should be --around--.

Col. 8, line 18, "compaired" should be --compared--.

Col. 8, line 64, "extablished" should be --established--.

Col. 10, line 14, "opposte" should be --opposite--.

Signed and Sealed this

Sixth Day of November 1979

[SEAL]

Attest:

RUTH C. MASON
Attesting Officer

LUTRELLE F. PARKER
Acting Commissioner of Patents and Trademarks